United States Patent [19]

Persyk et al.

[11] Patent Number: 5,148,029
[45] Date of Patent: Sep. 15, 1992

[54] IMPROVED SEAL SCINTILLATION CAMERA MODULE AND METHOD OF MAKING IT

[75] Inventors: Dennis E. Persyk, Barrington; Ivan Jazbec, Wilmette; Albrecht H. Enders, Palatine, all of Ill.

[73] Assignee: Siemens Gammasonics, Inc., Hoffman Estates, Ill.

[21] Appl. No.: 763,709

[22] Filed: Sep. 23, 1991

[51] Int. Cl.⁵ ............................................. G01T 1/164
[52] U.S. Cl. ........................... 250/361 R; 250/363.02
[58] Field of Search .................. 250/363.01, 363.02, 250/366, 361 R, 483.1

[56] References Cited

U.S. PATENT DOCUMENTS 3,919,557  11/1975  Berninger ........................ 250/366

*Primary Examiner*—Carolyn E. Fields
*Attorney, Agent, or Firm*—Mark H. Jay

[57] ABSTRACT

A scintillation crystal module of the type having a crystal housed in a backcap which is closed off by a glass window and sealed by an internal seal located between the window and the backcap is modified to include an external seal. The external seal is of moisture-impervious material and is attached to the outer surface of the backcap and the window and bridges over the boundary therebetween. The external seal may be made of an epoxy polyamid or a blocked urethane epoxy copolymer. The outer surface of the module may be sandblasted before the external seal is attached to the module, as by casting the adhesive in a suitable mold.

13 Claims, 1 Drawing Sheet

IMPROVED SEAL SCINTILLATION CAMERA MODULE AND METHOD OF MAKING IT

BACKGROUND OF THE INVENTION

The present invention relates to a scintillation crystal module used in a scintillation camera. More specifically, the invention relates to such a module which keeps its structural integrity even at elevated or depressed temperatures. In its most immediate sense, the invention relates to a method of retrofitting a purchased module so as to improve its structural integrity at high and low temperatures.

A conventional gamma camera includes a detector which converts gamma rays emitted from a patient into electrical signals. The detector includes a scintillation crystal and photodetectors which are in optical communication with the scintillation crystal. The gamma rays are directed to the scintillation crystal which absorbs the radiation and produces, in response, minute flashes of light. An array of photodetectors, which are placed in optical communication with the scintillation crystal, converts these flashes to electrical signals which are subsequently processed to form an image of that region of interest of the patient from which the radiation was emitted.

The scintillation crystal is usually a thallium-doped crystal of sodium iodide. The crystal deteriorates if exposed to moisture. Therefore, such a crystal is accommodated in a sealed module, which is usually purchased as a unit from a vendor. The module includes not only the crystal, but also an aluminum casing closed off by a glass window (usually with glass of the type marketed under the PYREX trademark). The window is provided so the photodetectors can respond to the scintillation events which take place within the crystal.

Conventional scintillation crystal modules include an internal seal which fills the gap between the glass window and the aluminum casing which surrounds it. However, when such modules are heated substantially above or cooled substantially below (as during shipment) room temperature, the seal frequently separates from the window and/or casing and the module admits moisture from the outside, causing the crystal to become unusable. This separation occurs because the aluminum casing and the glass window have significantly different thermal expansion coefficients and the forces which are generated during temperature changes cause the seal to break free of the parts to which it is attached.

Because of the great expense associated with replacement of the module, great attention has been paid to improving the internal seal within the module. However, the problem has remained unsolved and a seal which can maintain integrity of the module at high and low temperatures has not yet been developed.

It is thus a general object of the present invention to provide a scintillation crystal module which maintains the crystal in a sealed environment even at elevated and depressed temperatures.

Another object is, in general, to improve upon known scintillation crystal modules.

In accordance with the invention, a scintillation crystal module for use in a scintillation camera includes an external seal formed of moisture-impervious material which is attached to the outside of the module and bridges across the seal-filled gap between the casing and the window.

Preferably, the external seal is an epoxy polyamid or an elastomer such as a blocked urethane epoxy copolymer. Advantageously, the epoxy or epoxy copolymer is cast in a mold after the respective surfaces of the casing and the window have been ablated by sandblasting. The adhesive is introduced into the mold cavity and allowed to cure. A release agent is preferably applied to the mold surface to facilitate removal of the finished product from the mold.

By locating the external seal on the outside of the module and causing it to bridge the seal-filled gap between the window and the casing, the seal occupies a greatly increased volume and covers a greatly increased surface area. As a result, forces generated by the differing thermal expansion coefficients of aluminum and glass are distributed over a wider area and an increased volume and the seal is not broken when the module is subjected to high and low temperatures. As a result, the integrity of the module is maintained even at high and low temperatures.

BRIEF DESCRIPTION OF THE DRAWINGS

Exemplary and nonlimiting preferred embodiments of the invention are shown in the drawings, in which.

DETAILED DESCRIPTION OF PREFERRED EMBODIMENTS

Figure 1:
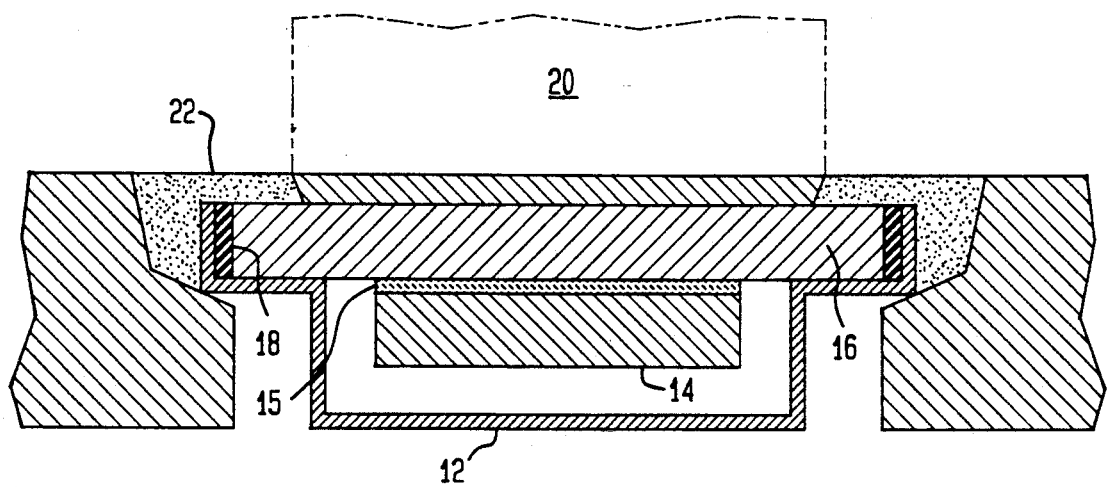
FIG. 1 is a sectional view of a preferred embodiment of a scintillation crystal module in accordance with a first embodiment of the invention.

Throughout all the Figures, the same or corresponding elements are always indicated by the same reference numerals and, for clarity, elements are not shown to scale.

FIG. 1 shows a sectional view of a preferred embodiment of a scintillation crystal module in accordance with the invention, generally designated by reference numeral 10. The scintillation crystal module 10 is usually a purchased part. It includes a thin aluminum casing 12, which will be referred to herein by the word "backcap" which is used in the art. The backcap 12 is stepped to define a lower section of smaller dimension and an upper section of greater dimension. A scintillation crystal 14, usually of NaI(Tl) is accommodated in the lower section of the backcap 12. The crystal 14 is adhered below a window 16 of glass by a layer of gel 15; one suitable kind of glass is sold under the PYREX trademark. The window 16 is securely mounted in the upper section of the backcap 12; to retain the connection between the window 16 and the backcap 12 and to preserve the air- and moisture-tight environment in which the crystal 14 is maintained, an internal epoxy seal 18 is introduced into the gap between them. While the seal 18 is of epoxy, this is not a part of the invention; the seal 18 need not have any particular shape nor need it be made of any particular material as long as it completely fills the gap between the window 16 and the backcap 12 so as to maintain the crystal 14 in a sealed environment into which moisture cannot enter.

In use, gamma radiation emitted from a patient (not shown) is directed through the backcap (thin aluminum is transparent to gamma rays) and is incident upon the crystal 14. In response, minute flashes of scintillation light ("scintillation events") are generated inside the crystal 14. An array 20 of photodetectors such as photomultiplier tubes view (as through a light pipe) the scintillation events through the window 16 and generate electrical signals in response; the array 20 is shown schematically in broken lines because it is not part of the invention. This operation of a scintillation camera is generally known and will not be further described here.

Practice has shown that module 10 loses its structural integrity at elevated or depressed temperatures. This is because aluminum and glass have different coefficients of thermal expansion. At high and low temperatures, the seal 18 separates from the backcap 12 and/or the window 16 because the dimensions of the backcap 12 and the window 16 change dissimilarly. In accordance with the invention, the module 10 is further provided with an external seal 22 which is added after the crystal 14 is sealed within the module 10. The seal 22 bridges across the gap (which is filled by the seal 18) between the backcap 12 and the window 16. Because the external seal 22 extends onto the outer surfaces of the backcap 12 and the window 16, it covers a wide surface area and is therefore not de-adhered by the dimensional changes caused by the different thermal expansion coefficient of glass and aluminum. Advantageously, the seal 22 is an epoxy polyamid adhesive (one suitable adhesive is sold under the ECCOBOND trademark using epoxy 45 and catalyst 15 by Emerson & Cuming, Woburn MA) or an elastomer such as a blocked urethane epoxy copolymer (one suitable elastomer is sold by Master Bond, Inc., Hackensack N.J. under the EP30DP designation).

Figure 2:
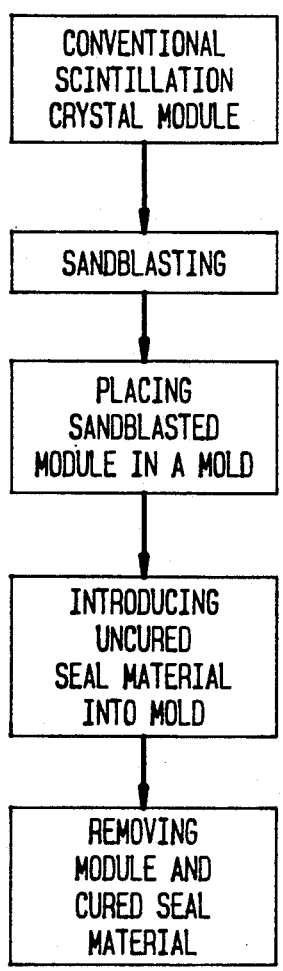
FIG. 2 is a schematic block diagram illustrating the steps for making an improved seal arrangement in accordance with t first embodiment of the invention.

FIG. 2 shows the preferred steps for securing the seal 22 to the module 10. As has been stated above, the module 10 is usually purchased as a unit from a vendor, and includes the backcap 12, the crystal 14, the window 16 and the seal 18.

Initially, the external surfaces of the module 10 to which the seal 22 is to be attached are prepared, advantageously by sandblasting. This aggressively ablates the surface and removes all surface oil and silicones (usually, all external and internal surfaces of the module 10 are contaminated with silicone fluid as a result of the processes by which the module 10 is manufactured) and roughens the surfaces as to promote adhesion with the seal 22. Advantageously, sandblasting is carried out by entraining an abrasive in a stream of compressed air and directing the stream against the surfaces to be sandblasted. After sandblasting, the module 10 is placed in a mold (see FIG. 3) and the external seal 22 is formed after the appropriate material is introduced into the mold cavity and allowed to cure. Advantageously, before the material is introduced into the mold, the surface of the mold cavity is coated with a release agent. This prevents the cured seal 22 from sticking to the mold. Suitable release agents are wax, silicone oil and TEFLON.

Figure 3:
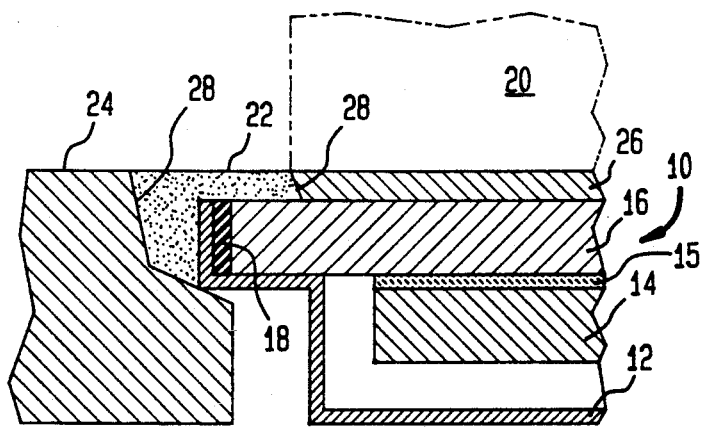
FIG. 3 is a fragmentary, sectional view of a mold in accordance with the first preferred embodiment of the invention.

FIG. 3 shows a fragmentary, sectional view of a mold for casting the material onto the module 10 so as to provide the external seal 22. The mold includes an outer mold portion 24 and a center mold portion 26 which define the cavity together with module 10. Suitably, the side walls of the outer mold portion 24 and center mold portion 26 are tapered by an angle 28 of approximately 3°-4° to facilitate removal of the cured piece or mold.

The uncured material is then introduced into the mold, as by injecting using a syringe, with the composition of the uncured material being selected such as to be self-leveling. The material should not be poured to a level exceeding the line as indicated in FIG. 3 because otherwise the center mold part 26 may become entrapped. It will also be appreciated by persons skilled in the art that casting of the uncured material in the mold should be carried out in such a way as not to entrap air. For this reason, the material should be de-aired prior to pouring (as by stirring or by vibrating in a vacuum vessel). Remaining air bubbles introduced during the pouring process will rise to the surface and can then be pierced and thereby collapsed. Suitable vibrators and stirrers are not part of the invention, and have been omitted from the Figures for simplicity.

After the uncured material has cured, the module 10 with the additional external seal 22 attached thereto is released by removal of the mold portions 24 and 26.

Tests were carried out to compare the structural integrity of a conventional module having a standard seal with a module manufactured in accordance with the present invention. These tests showed that at a temperature of 150° F. the standard seal in a conventional module deteriorated rapidly, while a module manufactured in accordance with the present invention maintained its structural integrity for an extended period even at a higher temperature of 185° F.

Figure 4:
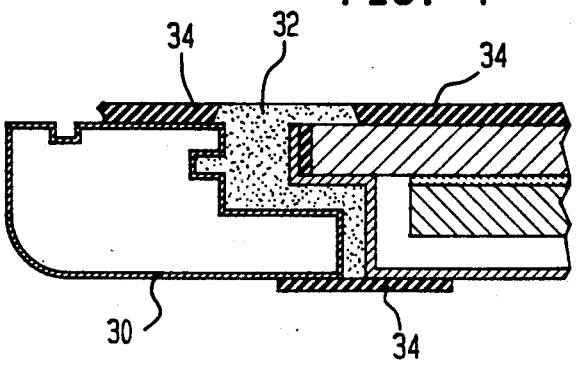
FIG. 4 is a sectional view of a second preferred embodiment of the invention in which a scintillation crystal module is mounted in a flange.

In cameras manufactured by Siemens Gammasonics, Inc., scintillation crystal modules are in certain instances (see FIG. 4) purchased as part of a larger assembly in which the module is mounted in a flange 30 (which itself is secured to the structure inside the camera detector head) using an adhesive 32 of the RTV (room-temperature vulcanizing) type. Such an adhesive is moisture-permeable and the only function served by the adhesive 32 is to temporarily retain the module in the flange 30. In a second preferred embodiment, the adhesive 32 is removed and replaced with a moisture-impervious adhesive, using the flange 30 as a mold and using other mold elements 34 so as to insure that the adhesive 32 substantially overlaps the flange 30 and the window 16. This causes the adhesive 32 to serve both as a mechanical retainer and as a seal against moisture. After the moisture-impervious adhesive 32 has cured, the mold elements 34 are removed.

Those skilled in the art will understand that changes can be made in the preferred embodiment here described, and that these embodiments can be used for other purposes. Such changes and uses are within the scope of the invention, which is limited only by the claims which follow.

We claim:

1. A scintillation crystal module for use in a scintillation camera and being of a type in which a crystal is contained in backcap closed off by a glass window and in which an internal seal fills a gap between the window and the backcap, the scintillation crystal module comprising an external seal of moisture-impervious material attached to the outer surface of the module on the backcap and window and bridging across the seal-filled gap therebetween.

2. The scintillation crystal module of claim 1, wherein said external seal is an elastomer.

3. The scintillation crystal module of claim 2, wherein said external seal is a blocked urethane epoxy copolymer.

4. The scintillation crystal module of claim 1, wherein said external seal is an epoxy polyamid.

5. An improved seal for a scintillation crystal module of the type in which a crystal is contained within a backcap closed off by a glass window, the seal comprising:
an internal seal filling a gap between the window and an inside surface of the backcap; and
an external seal of moisture-impervious material attached to the outer surfaces of the backcap and the window and bridging across the seal-filled gap therebetween.

6. An improved seal for a scintillation crystal module which employs an internal gap-filling seal for sealing a crystal in a moisture-free environment, said improved seal comprising an external seal of moisture-impervious material, attached to the outside of the module for bridging over the seal-filled gap.

7. A method of making an improved seal for a scintillation crystal module of the type which includes a crystal housed in a backcap closed off by a glass window and in which an internal seal fills the gap between the window and the backcap, said method comprising:
roughening and ablating the outside of the backcap and the window on both sides of the gap; and
attaching an external layer of moisture-impervious material to the roughened and ablated areas, thereby bridging across the seal-filled gap and providing an external seal.

8. The method of claim 7, wherein said roughening and ablating step is carried out by sandblasting.

9. The method of claim 7, wherein said attaching step includes casting the layer in a mold.

10. A method for improving the structural integrity of a scintillation crystal module which employs an internal seal for sealing a scintillation crystal in a moisture-free environment, comprising the steps of:
roughening and ablating an outer surface of the module adjacent and on both sides of the internal seal; and
attaching an external layer of moisture-impervious material to the roughened and ablated surface across the internal seal, thereby providing an external seal.

11. The method of claim 10, wherein said roughening and ablating step includes sandblasting.

12. The method of claim 10, wherein said attaching step includes casting the layer in a mold.

13. A scintillation crystal assembly for use in a scintillation camera and including a scintillation crystal module in which a crystal is contained in a backcap closed off by a glass window and in which an internal seal fills a gap between the window and the backcap, the scintillation crystal assembly comprising a flange and an external seal of moisture-impervious material attached to the outer surfaces of the backcap and window and bridging across the seal-filled gap therebetween, the external seal securing the module to the flange.

* * * * *